Figure 1:
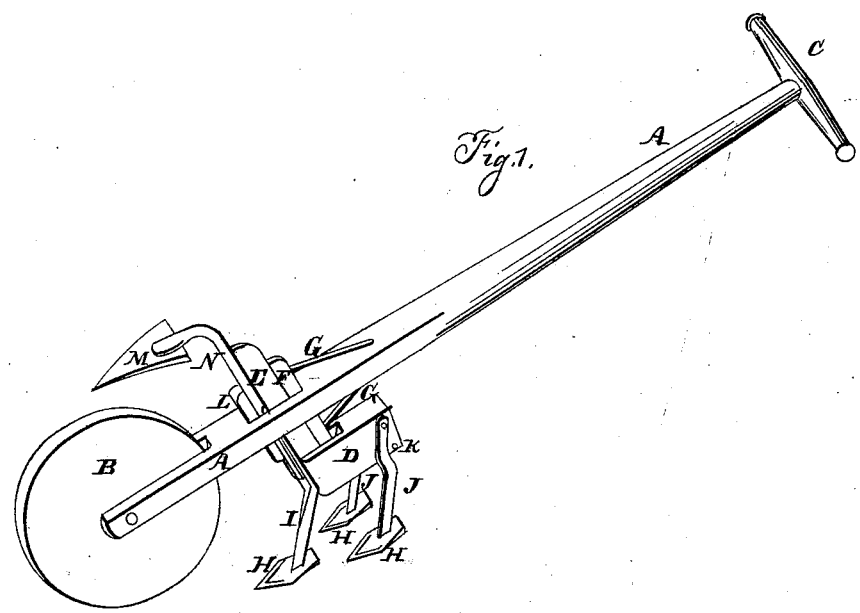

B. TAYLOR.

Hand Plow.

No. 81,034.

Patented Aug. 11, 1868

Witnesses:
Wm A Morgan
G. C. Cotton

Inventor:
B. Taylor
per Munn & Co
Attorneys

UNITED STATES PATENT OFFICE.

BARNETT TAYLOR, OF FORESTVILLE, MINNESOTA.

IMPROVEMENT IN HAND-CULTIVATORS.

Specification forming part of Letters Patent No. 81,034, dated August 11, 1868.

*To all whom it may concern:*

Be it known that I, BARNETT TAYLOR, of Forestville, in the county of Fillmore and State of Minnesota, have invented a new and useful Improvement in Hand-Cultivators; and I do hereby declare that the following is a full, clear, and exact description thereof, which will enable others skilled in the art to make and use the same, reference being had to the accompanying drawing, forming part of this specification, in which the figure is a perspective view of my improved hand-cultivator.

Similar letters of reference indicate corresponding parts.

My invention has for its object to furnish an improved hand-cultivator for cutting the weeds and stirring the ground between plants, whether of vegetables, grain, or trees, planted in rows or drills.

It consists in the combination and arrangement of the various parts of the machine, as hereinafter more fully described.

A is the beam of the machine, in the slotted forward end of which is pivoted the wheel B, and to the rear end of which is attached a cross-bar, C, to serve as a handle.

D is a block, the forward end of which is slotted vertically, as shown in the drawing. In the forward part of the slot thus formed is securely and rigidly attached a block or bar, E, which passes up through a slot in the beam A, a little in the rear of the slot in which the wheel B is pivoted.

F is a bar, which passes through the slot in the beam A, and against which the rear edge of the bar or block E rests, and by which the said block E is supported. The ends of the bar F project above and below the beam A, and its ends are supported by the braces G, the forward ends of which are attached to the ends of the said bar F, and the rear ends of which are attached to the beam A, as shown in the drawing.

H are the plows or cutters, which are made in substantially the shape shown in the figure, and which are rigidly attached to the lower ends of the uprights I and J in such positions that when at work they may be in or very nearly in a horizontal position, so as to cut off the weeds and stir the ground without any danger of covering even the smallest plants. The upright I of the forward cutter passes up along and is rigidly attached to the forward edge of the block or bar E. The upper ends of the uprights J are pivoted to the upper part of the rear end of the block D, and their rear edges rest, when they are in working position, against stops K, attached to the lower part of the sides of the rear end of the said block D. This enables one or both the rear cutters to be turned up out of the way, so that one, two, or three of the cutters H may be used, as the space between the rows of plants may require. The blocks D and E, with their attached cutters, are adjustably secured in place in the slot in the beam A by the wedge L, driven into the forward part of said slot, in front of the forward part of the forward edge of the bar E, as shown in the drawing.

M is a shovel or plow attached to the outer or curved end of the upright N, the other end of which enters the slot in the beam A, between the forward edge of the bar or block E and the rear edge of the wedge L, so as to be adjustably secured in place by the same wedge, L, that secures the other cutters or plows to said beam.

The shovel M is designed to be used in the case of larger plants, or when the ground is required to be stirred more than it can be by the horizontal cutters H.

The shovel M may also be used with advantage for marking the ground for planting seeds, plants, shrubs, trees, &c.

Having thus described my invention, I claim as new and desire to secure by Letters Patent—

The combination of the cutters H, stationary upright I, pivoted uprights J, block D, adjustable block or bar E, supporting-bar F, shovel-plow M N, and wedge L with each other and with the slotted beam A and wheel B, substantially as herein shown and described, and for the purpose set forth.

BARNETT TAYLOR.

Witnesses:
M. J. FOSTER,
D. R. MEGHUS.